United States Patent
Malina

(10) Patent No.: US 9,128,820 B1
(45) Date of Patent: Sep. 8, 2015

(54) FILE MANAGEMENT AMONG DIFFERENT ZONES OF STORAGE MEDIA

(75) Inventor: James N. Malina, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 224 days.

(21) Appl. No.: 13/526,241

(22) Filed: Jun. 18, 2012

(51) Int. Cl.
G06F 12/00 (2006.01)
G06F 12/02 (2006.01)

(52) U.S. Cl.
CPC ........ G06F 12/0238 (2013.01); G06F 12/0246 (2013.01); G06F 12/0253 (2013.01); *G06F 2212/21* (2013.01); *G06F 2212/214* (2013.01); *G06F 2212/217* (2013.01)

(58) Field of Classification Search
CPC .......... G06F 2212/21; G06F 2212/214; G06F 2212/217; G06F 12/0238; G06F 12/0246; G06F 12/0253
USPC .................. 711/103, 112, 117, 156, 170, 173
See application file for complete search history.

(56) References Cited

U.S. PATENT DOCUMENTS

| | | | |
|---|---|---|---|
| 5,404,485 A | 4/1995 | Ban | |
| 5,485,613 A * | 1/1996 | Engelstad et al. | 1/1 |
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |
| 6,195,218 B1 | 2/2001 | Guttmann et al. | |
| 6,205,494 B1 | 3/2001 | Williams | |
| 6,208,477 B1 | 3/2001 | Cloke et al. | |
| 6,223,303 B1 | 4/2001 | Billings et al. | |
| 6,230,233 B1 | 5/2001 | Lofgren et al. | |
| 6,246,346 B1 | 6/2001 | Cloke et al. | |
| 6,249,393 B1 | 6/2001 | Billings et al. | |
| 6,256,695 B1 | 7/2001 | Williams | |
| 6,262,857 B1 | 7/2001 | Hull et al. | |
| 6,263,459 B1 | 7/2001 | Schibilla | |
| 6,272,694 B1 | 8/2001 | Weaver et al. | |

(Continued)

OTHER PUBLICATIONS

Tsai et al, Configuration NAND Flash Translation Layer, Proceedings of the IEEE International Conference on Sensor Networks, Ubiquitous, and Trustworthy Computing (SUTC'06), Jun. 5-7, 2006.

(Continued)

*Primary Examiner* — Shawn X Gu

(57) ABSTRACT

Apparatus and methods for managing files among different zones of storage media in at least one non-volatile storage device. At least a first zone is associated with a first type of storage media and a second zone is associated with a second type of storage media. A file having at least one attribute is accepted with the at least one attribute describing a characteristic of the file. It is determined whether the at least one attribute meets an attribute criteria and the file is stored in the first zone and/or the second zone based on the determination of whether the at least one attribute meets the attribute criteria.

27 Claims, 10 Drawing Sheets

(56) References Cited

U.S. PATENT DOCUMENTS

| | | |
|---|---|---|
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,393,511 B1 | 5/2002 | Albrecht et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |

(56) References Cited

U.S. PATENT DOCUMENTS

| | | |
|---|---|---|
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,408,731 B2 | 8/2008 | Uemura et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,830,632 B2 | 11/2010 | Tang et al. |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,899,987 B2 | 3/2011 | Salomon et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 7,996,645 B2 | 8/2011 | New et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,041,878 B2 | 10/2011 | Lee |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,108,602 B2 | 1/2012 | New et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |

(56) References Cited

U.S. PATENT DOCUMENTS

| | | |
|---|---|---|
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,458,526 B2 | 6/2013 | Dalphy et al. |
| 8,462,466 B2 | 6/2013 | Huber |
| 8,467,151 B1 | 6/2013 | Huber |
| 8,489,841 B1 | 7/2013 | Strecke et al. |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 | 12/2013 | Champion et al. |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,634,158 B1 | 1/2014 | Chahwan et al. |
| 8,635,412 B1 | 1/2014 | Wilshire |
| 8,640,007 B1 | 1/2014 | Schulze |
| 8,654,619 B1 | 2/2014 | Cheng |
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,303 B2* | 4/2014 | Hall ............................ 360/48 |
| 8,687,306 B1 | 4/2014 | Coker et al. |
| 8,693,133 B1 | 4/2014 | Lee et al. |
| 8,694,841 B1 | 4/2014 | Chung et al. |
| 8,699,159 B1 | 4/2014 | Malina |
| 8,699,171 B1 | 4/2014 | Boyle |
| 8,699,172 B1 | 4/2014 | Gunderson et al. |
| 8,699,175 B1 | 4/2014 | Olds et al. |
| 8,699,185 B1 | 4/2014 | Teh et al. |
| 8,700,850 B1 | 4/2014 | Lalouette |
| 8,743,502 B1 | 6/2014 | Bonke et al. |
| 8,749,910 B1 | 6/2014 | Dang et al. |
| 8,751,699 B1 | 6/2014 | Tsai et al. |
| 8,755,141 B1 | 6/2014 | Dang |
| 8,755,143 B2 | 6/2014 | Wilson et al. |
| 8,756,361 B1 | 6/2014 | Carlson et al. |
| 8,756,382 B1 | 6/2014 | Carlson et al. |
| 8,769,593 B1 | 7/2014 | Schwartz et al. |
| 8,773,802 B1 | 7/2014 | Anderson et al. |
| 8,780,478 B1 | 7/2014 | Huynh et al. |
| 8,782,334 B1 | 7/2014 | Boyle et al. |
| 8,793,532 B1 | 7/2014 | Tsai et al. |
| 8,797,669 B1 | 8/2014 | Burton et al. |
| 8,799,977 B1 | 8/2014 | Kapner, III et al. |
| 2004/0186946 A1 | 9/2004 | Lee |
| 2006/0045387 A1* | 3/2006 | Quick et al. .................. 382/305 |
| 2007/0174582 A1 | 7/2007 | Feldman |
| 2008/0209103 A1* | 8/2008 | Haga ............................ 711/100 |
| 2009/0113702 A1 | 5/2009 | Hogg |
| 2009/0319720 A1* | 12/2009 | Stefanus et al. ............. 711/103 |
| 2010/0049902 A1* | 2/2010 | Kakihara et al. ............ 711/103 |
| 2010/0235562 A1* | 9/2010 | Gaither et al. ............... 711/102 |
| 2010/0306551 A1 | 12/2010 | Meyer et al. |
| 2011/0075292 A1 | 3/2011 | New et al. |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0303928 A1 | 11/2012 | Hall |
| 2012/0324980 A1 | 12/2012 | Nguyen et al. |
| 2013/0111171 A1* | 5/2013 | Hirezaki et al. ............. 711/165 |

OTHER PUBLICATIONS

Seagate Banded Device Feature Set, Slide Presentation F11131, Seagate, Aug. 16, 2011.
JFFS2: The Journalling Flash File System, version 2, downloaded from http://sourceware.org/jffs2/, on Jun. 2, 2011.
TFAT Overview, downloaded from http://msdn.microsoft.com/en-us/library/aa915463.aspx, on Jun. 2, 2011.
Using Common Log File System, downloaded from http://msdn.microsoft.com/en-us/library/ff565363.aspx, on Jun. 2, 2011.
Yaffs, A Flash file system for embedded use, downloaded from http://www.yaffs.net/, on Jun. 2, 2011.
Manning, Charles, "How Yaffs Works," 2007-2010, downloaded from http://www.yaffs.net/sites/yaffs.net/files/HowYaffsWorks.pdf, on Jun. 2, 2011.
Gibson et al, "Shingled Disks and their File Systems: ShingledFS," Parallel Data Lab Retreat, Nov. 2011, Parallel Data Laboratory, Carnegie Mellon University, Nov. 2011.
James N. Malina, U.S. Appl. No. 13/330,156, filed Dec. 19, 2011, 43 pages.
Chris Mellor, "Hitachi GST plugs its areal hole with shingles," The Register http://www.theregister.co.uk/2011/07/29/hgst_smr/?page=1, Jul. 29, 2011, pp. 1-4.
Chris Mellor, "Hitachi GST plugs its areal hole with shingles," The Register http://www.theregister.co.uk/2011/07/29/hgst_smr/?page=2, Jul. 29, 2011, pp. 1-3.

* cited by examiner

| User File 40 |  |
|---|---|
| File Header | |
| File Name: | Running.mp4 |
| File Size: | 1.33 GB |
| Created: | July 11, 2009, 2:26:45 P.M. |
| Modified: | July 11, 2009, 2:31:18 P.M. |
| Accessed: | August 31, 2010, 9:22:58 P.M. |
| Frequency: | 0 |
| File Data | |

| User File 42 |  |
|---|---|
| File Header | |
| File Name: | Ella.docx |
| File Size: | 50 KB |
| Created: | March 7, 2012, 8:31:12 P.M. |
| Modified: | April 6, 2012, 12:05:52 P.M. |
| Accessed: | April 6, 2012, 12:02:11 P.M. |
| Frequency: | 4 |
| File Data | |

| User File 44 |  |
|---|---|
| File Header | |
| File Name: | Natalie.mp3 |
| File Size: | 6.1 MB |
| Created: | January 31, 2011, 4:35:18 P.M. |
| Modified: | January 31, 2011, 4:40:21 P.M. |
| Accessed: | November 13, 2011, 10:11:36 A.M. |
| Frequency: | 0 |
| File Data | |

| Downloaded File 46 |  |
|---|---|
| File Header | |
| File Name: | Vampires.mp4 |
| File Size: | 1.26 GB |
| Created: | April 8, 2012, 10:57:37 A.M. |
| Modified: | April 8, 2012, 11:02:16 A.M. |
| Stream Identifier: | A |
| File Data | |

| Downloaded File 48 |  |
|---|---|
| File Header | |
| File Name: | MCLE.mp4 |
| File Size: | 1.62 GB |
| Created: | April 8, 2012, 10:59:04 A.M. |
| Modified: | April 8, 2012, 11:03:12 A.M. |
| Stream Identifier: | B |
| File Data | |

| Operating System File 18 |  |
|---|---|
| File Header | |
| File Name: | CCMSetup.log |
| File Size: | 10KB |
| Created: | April 10, 2012, 1:06:14 P.M. |
| Modified: | April 10, 2012, 1:08:21 P.M. |
| Accessed: | April 10, 2012, 1:08:21 P.M. |
| Frequency: | 10 |
| File Data | |

FIG. 5

FILE MANAGEMENT AMONG DIFFERENT ZONES OF STORAGE MEDIA

BACKGROUND

Disk drives are often used to record data onto or to reproduce data from a recording media. A disk drive can include a rotating magnetic disk and a head actuated over the disk to magnetically write data to and read data from the disk. The disk includes a plurality of radially spaced, concentric tracks for recording user data.

The storage device industry is always trying to increase the recording density of the disk, or in other words, the amount of data that can be stored in a given area on the disk. Shingled magnetic recording (SMR) has recently been introduced as a way of increasing the number of tracks per inch (TPI) by making the tracks narrower. Since it is technologically easier to read narrow tracks than to write narrow tracks, SMR increases TPI by using a relatively wide shingle write head with a stronger magnetic field to overlap tracks like roof shingles. The non-overlapping portion then serves as a narrow track that can be read by a narrower read head.

However, this overlap can create a problem when writing data since new writes to a previously overlapped track affects data written in the overlapping track. In addition, due to the stronger magnetic field of the write head, data in several adjacent tracks in either an inside diameter direction or an outside diameter direction of the disk can be affected depending on a direction of overlap. This problem is known as adjacent track interference (ATI). Thus, SMR presents additional challenges not present in conventional disk drives.

In addition to SMR technology, non-volatile flash memory is becoming increasingly popular as a storage medium due to its data transfer speeds, size, and durability. However, as with SMR technology, flash memory also presents its own unique challenges in managing data. For example, portions of flash memory may become unusable after a high number of writes. In addition, the capacity of flash memory may be limited due to the extra cost of providing large amounts of flash memory.

Due to the different advantages provided by various types of storage media, computer systems and/or storage devices may combine different types of storage media. However, efficiently managing files among various types of storage media can prove difficult due to the different limitations of the various types of storage media.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed. Reference numbers are reused throughout the drawings to indicate correspondence between referenced elements.

FIG. 5 depicts example files according to an embodiment.

DETAILED DESCRIPTION

In the following detailed description, numerous specific details are set forth to provide a full understanding of the present disclosure. It will be apparent, however, to one ordinarily skilled in the art that the various embodiments disclosed may be practiced without some of these specific details. In other instances, well-known structures and techniques have not been shown in detail to avoid unnecessarily obscuring the various embodiments.

Figure 1:
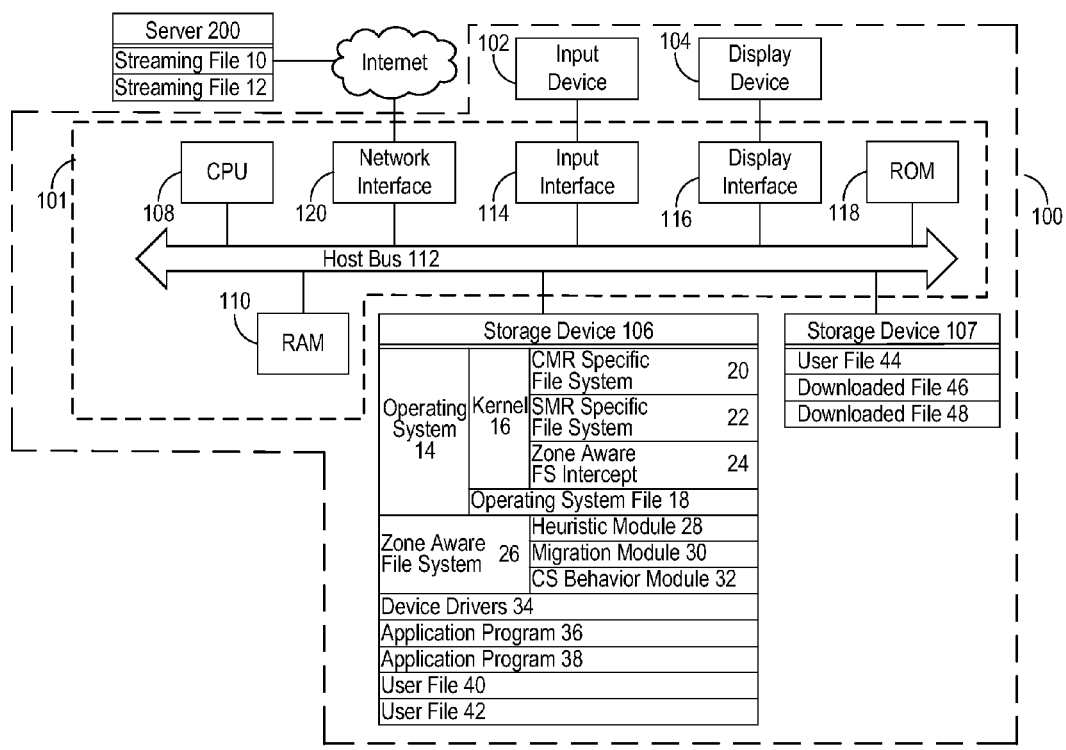
FIG. 1 is a block diagram depicting a computer system including storage devices according to an embodiment.

FIG. 1 shows computer system 100 and server 200 which are connected via the Internet. Server 200 could be for example, a cloud based server for delivering media such as movies or music to computer system 100. In this regard, server 200 contains streaming files 10 and 12 which include data that can be delivered as a stream of data to computer system 100 via the Internet.

As shown in FIG. 1, computer system 100 includes host 101, input device 102, display device 104, and storage devices 106 and 107. Computer system 100 can be, for example, a personal computer system, smart phone, or other electronic device. In this regard, computer system 100 may be a stand-alone system or part of a network. Input device 102 can be a keyboard, scroll wheel, or pointing device allowing a user of computer system 100 to enter information and commands to computer system 100, or to allow a user to manipulate objects displayed on display device 104. In other embodiments, input device 102 and display device 104 can be combined into a single component, such as a touch-screen that displays objects and receives user input.

In the embodiment of FIG. 1, host 101 includes central processing unit (CPU) 108 which can be implemented using one or more processors for executing instructions including a microcontroller, a Digital Signal Processor (DSP), an Application Specific Integrated Circuit (ASIC), a Field Programmable Gate Array (FPGA), hard-wired logic, analog circuitry and/or a combination thereof. CPU 108 interfaces with host bus 112. Also interfacing with host bus 112 are random access memory (RAM) 110, input interface 114 for input device 102, display interface 116 for display device 104, read only memory (ROM) 118, storage device 106, storage device 107, and network interface 120 for communicating with devices via a network, such as with server 200 via the Internet.

RAM 110 interfaces with host bus 112 so as to provide information stored in RAM 110 to CPU 108 during execution of instructions in software programs such as operating system 14, application programs 36 and 38, device drivers 34 and zone aware file system 26. More specifically, CPU 108 first loads computer-executable instructions from storage device 106 and/or storage device 107 into a region of RAM 110. CPU 108 can then execute the stored process instructions from RAM 110. In addition, RAM 110 can store data to be written to or read from storage devices 106 and/or 107 for access by CPU 108 during execution of software programs to the extent that such software programs have a need to access and/or modify the data.

As shown in FIG. 1, storage device 106 contains operating system 14, which includes kernel 16 and operating system file 18. In the embodiment of FIG. 1, kernel 16 includes two media specific file systems—conventional magnetic recording (CMR) specific file system 20 and shingled magnetic recording (SMR) specific file system 22. In addition, kernel 16 includes zone aware file system (FS) intercept 24.

Each of CMR specific file system 20 and SMR specific file system 22 manages files stored in a particular type or types of storage media. For example, SMR specific file system 22 can manage files stored in an SMR media of storage devices 106 and/or 107, and CMR specific file system 20 can manage files stored in CMR and SSD (solid state drive) media of storage devices 106 and/or 107. As described in more detail below with reference to FIG. 4, CMR specific file system 20, SMR specific file system 22, and zone aware FS intercept 24 can work together with zone aware file system 26 to manage files of computer system 100.

In alternative embodiments, file systems such as CMR specific file system 20, SMR specific file system 22, or zone aware file system 26 can be configured as part of a device driver, or as a stand-alone application program. Those of ordinary skill in the art will appreciate that the present disclosure is not limited to these embodiments and that the disclosed processes for managing files among different zones of storage media may be implemented in other environments. For example, the disclosed processes for managing files using SMR specific file system 22 can be implemented using the data management module disclosed in co-pending U.S. application Ser. No. 13/330,156, the contents of which are hereby incorporated by reference.

In this regard, the disclosed arrangement of storage device 106 in FIG. 1 is merely an example arrangement and each of the contents of storage device 106 in FIG. 1 should be seen as optional. For example, the file management processes disclosed herein can be performed by a controller of storage device 106 (e.g., controller 122 of FIG. 2) using firmware of storage device 106 without involving host 101. In other embodiments, storage device 106 can include other file systems in addition to CMR specific file system 20, SMR specific file system 22, and zone aware file system 26 for additional types of storage media.

As shown in FIG. 1, zone aware file system 26 includes heuristic module 28, migration module 30, and computer system (CS) behavior module 32. Heuristic module 28 contains computer-executable instructions for setting various rules to be applied by zone aware file system 26 in managing files of computer system 100. Migration module 30 includes computer-executable instructions for handling the migration of files from one type of storage media to a different type of storage media. In this regard, different types of storage media can be contained in a single storage device or in different storage devices. CS behavior module 32 includes computer-executable instructions for monitoring the status of computer system 100, such as for monitoring when computer system 100 is subject to a vibration condition, in a low battery state, or in an idle state in terms of usage of CPU 108 and/or RAM 110.

In addition, storage device 106 includes device drivers 34 for software interfaces to devices such as input device 102, display device 104 and/or storage devices 106 and 107. Storage device 106 also includes application programs 36 and 38, which can be, for example, a word processing program and a multimedia program for modifying or accessing files, such as user files 40 and 42.

In addition to storage device 106, computer system 100 also includes storage device 107 which contains user file 44, downloaded file 46, and downloaded file 48. In the example of FIG. 1, downloaded files 46 and 48 correspond to streaming files 10 and 12, respectively. More specifically, streams of data from streaming files 10 and 12 have been received by network interface 120 from server 200, and stored as downloaded files 46 and 48 in storage device 107.

In alternative embodiments, computer system 100 can include a single storage device having different types of storage media such as a disk drive having both CMR media and SMR media. In such embodiments, computer system 100 may only include storage device 106 without storage device 107 or vice versa.

Figure 2:
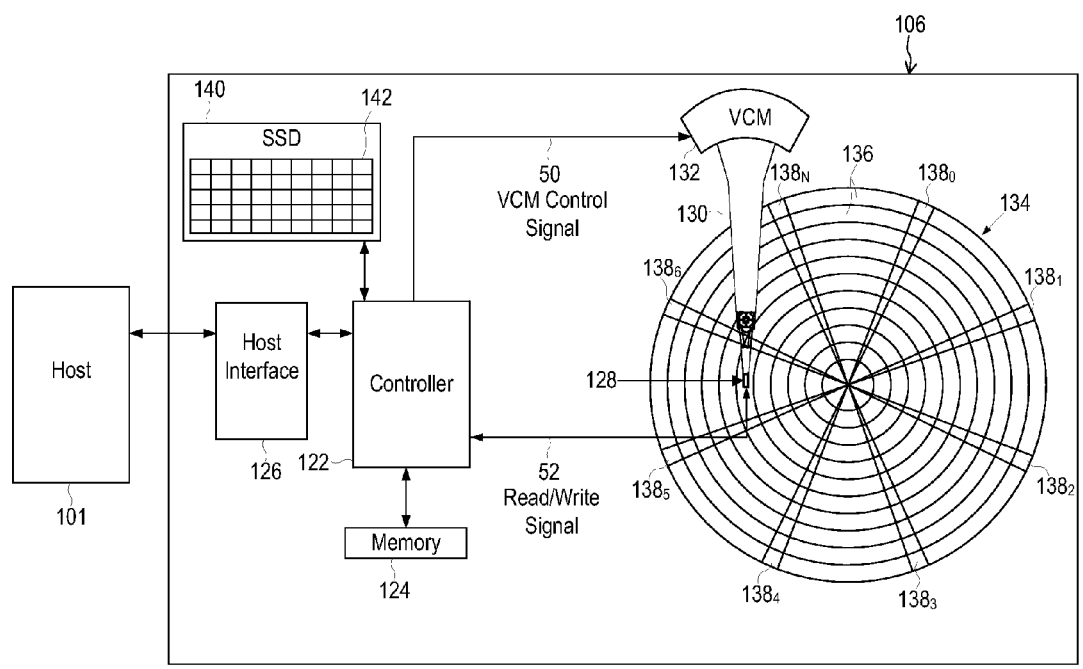
FIG. 2 is a block diagram depicting a storage device of FIG. 1.

FIG. 2 illustrates a block diagram of storage device 106 according to one example embodiment. Although storage device 106 is shown, a similar configuration may apply to storage device 107 as well. As shown in FIG. 2, storage device 106 includes rotating magnetic disk 134 and head 128 connected to the distal end of actuator arm 130 which is rotated about a pivot by voice coil motor (VCM) 132 to position head 128 over disk 134. Head 128 includes at least a read element for reading data from disk 134, and a write element for writing data onto disk 134. Examples of a read element and a write element are described as read element 134 and write element 136 in FIG. 3 of co-pending U.S. application Ser. No. 13/525,611, the contents of which are hereby incorporated by reference. Storage device 106 also includes a spindle motor (not shown) for rotating disk 134 during read/write operations.

As shown in FIG. 2, storage device 106 includes controller 122 which can perform various operations of storage device 106 described herein. Storage device 106 also includes memory 124 and host interface 126. Memory 124 can include a volatile memory, such as DRAM, and/or a non-volatile memory for storing data. Data stored in memory 124 includes data read from disk 134, data to be written to disk 134, or instructions for controlling storage device 106. Controller 122 can be implemented using one or more processors for executing instructions and can include a microcontroller, a Digital Signal Processor (DSP), an Application Specific Integrated Circuit (ASIC), a Field Programmable Gate Array (FPGA), hard-wired logic, analog circuitry and/or a combination thereof.

Host interface 126 is configured to interface storage device 106 with host 101 and may interface according to the serial advanced technology attachment (SATA) standard or other standards such as serial attached SCSI (SAS).

Figure 3:
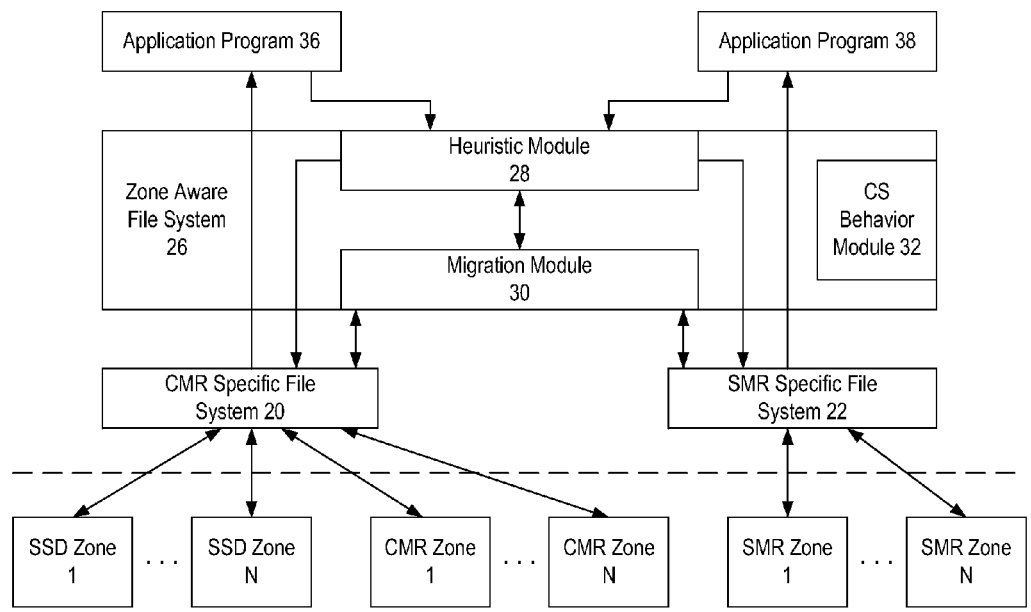
FIG. 3 is a logical diagram illustrating the routing of files according to an embodiment.

Disk 134 comprises a number of radial spaced, concentric tracks 136, which are grouped together into zones of tracks (e.g., zones 224, 226 and 228 in FIG. 3 of incorporated U.S. application Ser. No. 13/525,611. Each track 136 is divided into a number of sectors that are spaced circumferentially along track 136. The sectors may be used to store user data and/or other information. Disk 134 also includes a plurality of angularly spaced servo wedges $138_0$-$138_N$, each of which may include embedded servo information that can be read from disk 134 by head 128 to determine the position of head 128 over disk 134. For example, each servo wedge $138_0$-$138_N$ may include a pattern of alternating magnetic transitions (servo burst), which may be read from disk 134 by head 128 and processed by controller 122 to estimate the position of head 128 relative to disk 134. The angular spacing between servo wedges $138_0$-$138_N$ may be uniform, as shown in the example of FIG. 2.

As shown in FIG. 2, storage device 106 includes an optional solid state device (SSD) 140 in addition to disk 134 for storing data. In this regard, storage device 106 may be referred to as a hybrid drive since it uses both the magnetic recording media of disk 134 and the solid state recording media of SSD 140. As used in this application, solid state recording media may comprise a wide variety of technologies, such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), or other discrete NVM (non-volatile memory) chips. Such solid state recording media may be physically divided into memory regions such as planes, blocks, pages, and sectors, as is known in the art. In the example of FIG. 2, SSD 140 is divided into SSD zones 142 for storing a set amount of data, such as 512 KB.

In operation, controller 122 writes data to and reads data from disk 134 and/or SSD 140 in response to commands from host 101 received via host interface 126. When controller 122 receives a write command from host 101 with data to be written to disk 134 or SSD 140, controller 122 temporarily holds the received data in memory 124.

To write data to disk 134, controller 122 positions head 128 on disk 134 by sending VCM control signal 50 (e.g., control current) to VCM 132. Controller 122 positions head 128 based on position information read from one or more servo wedges $138_0$-$138_N$. Controller 122 processes data to be written to disk 134 into write signal 52, which is output to head 128. For its part, a write element of head 128 converts write signal 52 into a magnetic field that magnetizes the surface of the disk 134 based upon write signal 52, thereby magnetically writing data to disk 134. Controller 122 may notify host 101 via host interface 126 after data for the write command has been successfully written to disk 134.

When controller 122 receives a read command from host 101, requesting data written on disk 134, controller 122 positions head 128 on disk 134 by sending VCM control signal 50 to VCM 132. A read element of head 128 generates read signal 52 based upon the magnetization of the disk surface under head 128, and controller 122 processes read signal 52 into data.

To increase the data storage capacity of disk 134, storage device 106 has the capability to write data to disk 134 using shingled magnetic recording (SMR) so that tracks on disk 134 overlap. More specifically, the write element of head 128 is adapted for SMR which means that, among other things, it is wider than the read element of head 128. The non-overlapping portions of the overlapping tracks serve as narrow tracks that can be read by the narrower read element of head 128.

Storage device 107 can include many of the same components discussed above with reference to storage device 106. For example, storage device 107 can be a disk drive having both SMR and CMR media, or having only one of these media types.

FIG. 3 illustrates one embodiment of a logical diagram for the routing of files by zone aware file system 26, CMR specific file system 20, and SMR specific file system 22 of FIG. 1.

As shown in FIG. 3, zone aware file system 26 provides a unified interface for CMR specific file system 20 and SMR specific file system 22 with application programs 36 and 38. In other embodiments, zone aware file system 26 can provide a unified interface for more media specific file systems in addition to CMR specific file system 20 and SMR specific file system 22.

In FIG. 3, zone aware file system 26 accepts files from application programs 36 and 38 as indicated by the arrows from application programs 36 and 38 to heuristic module 28 of zone aware file system 26. The files may be accepted from application programs 36 and 38 as part of a write command generated by host 101. Heuristic module 28 includes at least one attribute criteria such as, for example, providing that a size of a file is less than or greater than a predetermined file size, or that a file type extension of a file name matches at least one of a predetermined file type extension. Other examples of attribute criteria of heuristic module 28 may include providing that an age of a file, such as the time since the file was last modified, is less than or greater than a predetermined age, or that a frequency of changes to a file is less than or greater than a predetermined frequency. The attribute criteria are further explained below with reference to the example files of FIG. 5 and the process of FIG. 6.

Heuristic module 28 of zone aware file system 26 determines whether at least one attribute of the accepted files meets an attribute criteria. Depending on whether the accepted files meet the attribute criteria, zone aware file system 26 routes the files to either CMR specific file system 20 or SMR specific file system 22. Each of CMR specific file system 20 and SMR specific file system 22 in turn can store the accepted files in one or more of SSD zones 1 to N, CMR zones 1 to N, and SMR zones 1 to N.

In the example of FIG. 3, SSD zones 1 to N correspond to SSD zones 142 of SSD 140 of FIG. 2. CMR zones 1 to N correspond to zones of non-overlapping tracks on disk 134 of storage device 106 and/or storage device 107. SMR zones 1 to N correspond to zones of overlapping tracks on disk 134 and on at least one disk of storage device 107. As will be appreciated by those of ordinary skill in the art, each of storage devices 106 and 107 can include both SMR and CMR zones. In addition, storage device 106 further includes SSD zones.

As shown in FIG. 3, the zones of different types of storage media (SSD, CMR and SMR) are shown below the dashed line to indicate that they are physically located outside of host 101 in storage devices 106 and 107. Although three different types of storage media are represented in FIG. 3, those of ordinary skill in the art will appreciate that the present disclosure is not limited to three different types of storage media and may include more types of storage media, or only two types of storage media. Furthermore, alternative embodiments may include additional file systems for additional types of storage media.

By determining whether at least one attribute of a file meets an attribute criteria, it is ordinarily possible to store a file in a type of storage media that suits the characteristics of the file. For example, files that are frequently modified, such as operating system file 18, can be stored in CMR zones 1 to N since SSD zones 1 to N may become unusable after a high number of writes and since SMR zones 1 to N are sequentially written. Larger files that are not frequently modified, such as video files, can be directed to sequentially written zones with larger capacity, such as SMR zones 1 to N.

In the example embodiment of FIG. 3, CMR specific file system 20 manages files for SSD zones 1 to N and CMR zones 1 to N. CMR specific file system 20 can be, for example, a modified version of a file system such as EXT4, which is used with the Linux operating system. On the other hand, SMR specific file system 22 manages files for SMR zones 1 to N. SMR specific file system 22 can be, for example, a modified version of a logging file system, such as LogFS or NILFS2, which are used with the Linux operating system. In the example of FIG. 3, SMR specific file system 22 can be modified from being used for flash memory to being used for SMR zones 1 to N. Furthermore, SMR specific file system 22 includes processes specific to SMR zones, such as the processes discussed below with reference to FIGS. 8 to 10.

In addition to receiving files from heuristic module 28 of zone aware file system 26, CMR specific file system 20 and SMR specific file system 22 also provide files to zone aware file system 26 in accordance with, for example, a read command of host 101. In some cases, the files provided by CMR specific file system 20 and SMR file system 22 may be further routed to application programs 36 and 38, which may have caused a read command to be generated by host 101.

As shown in FIG. 3, zone aware file system 26 also includes migration module 30 which facilitates migration of files between zones managed by CMR specific file system 20 and SMR specific file system 22. Such migration can occur, for example, when a capacity of one media type is almost full. In migrating files between CMR specific file system 20 and SMR specific file system 22, migration module 30 exchanges information with heuristic module 28 concerning at least one file attribute of a file and associated attribute criteria. For example, migration module 30 can send a file attribute of a file considered for migration from a CMR zone managed by CMR specific file system 20 to an SMR zone managed by SMR specific file system 22. Heuristic module 28 determines whether the file attribute received from migration module 30 meets an attribute criteria for storing the file in an SMR zone managed by SMR specific file system 22. If the file attribute meets the attribute criteria, heuristic module 28 sends an indication to migration module 30 indicating the file is suitable for migration from a CMR zone to an SMR zone. The file is then passed by migration module 30 from CMR specific file system 20 to SMR specific file system 22 for storage in an SMR zone. CMR specific file system 22 then marks the file as obsolete in the CMR zone to free up capacity in the CMR zone, thereby completing the migration process.

Figure 7:
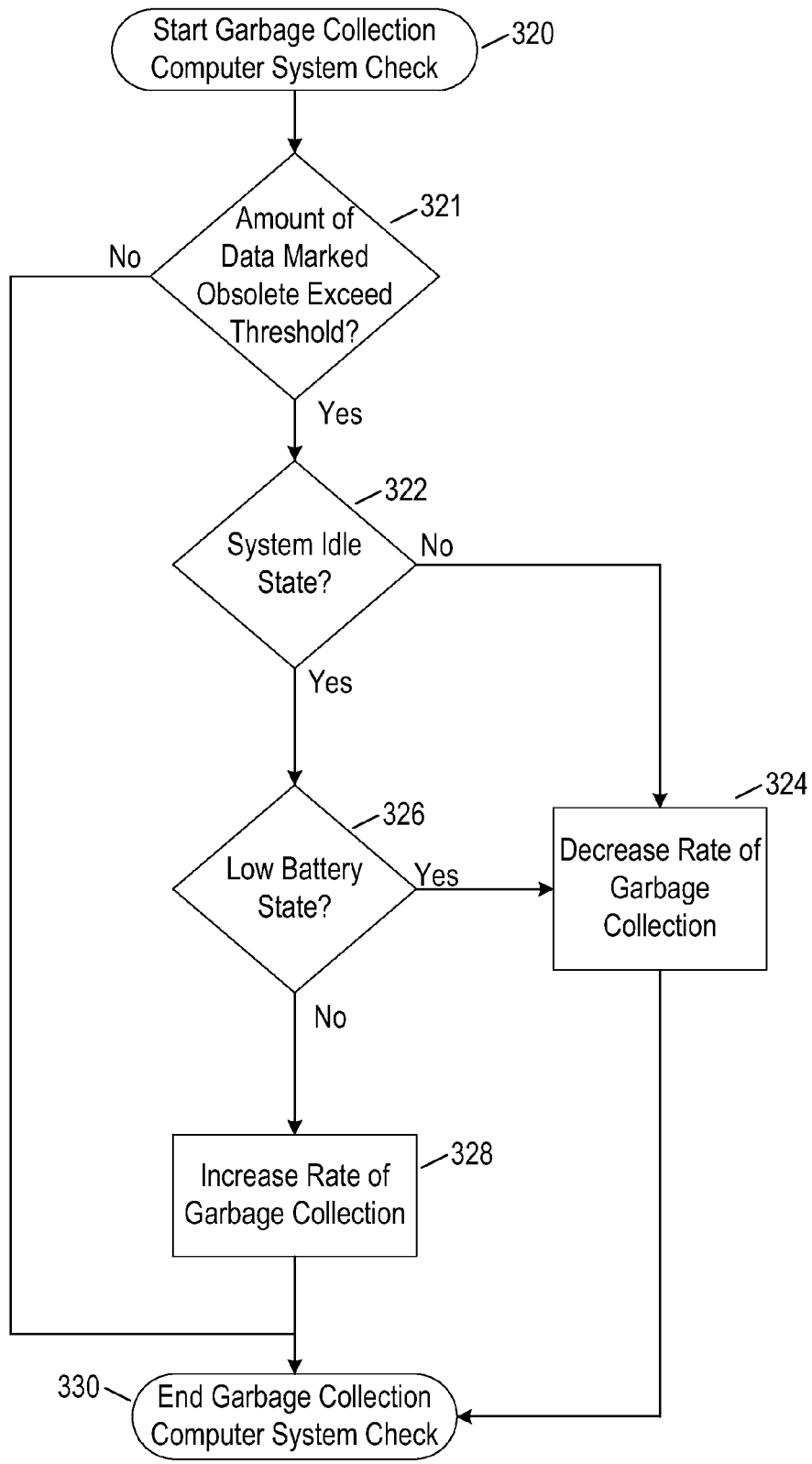
FIG. 7 is a flowchart depicting a process for controlling a rate of garbage collection according to an embodiment.

As shown in FIG. 3, zone aware file system 26 also includes CS behavior module 32 which monitors the status of computer system 100. More specifically, CS behavior module 32 can monitor conditions of computer system 100 such as whether storage device 106 or storage device 107 is experiencing environmental conditions that could affect data storage, such as vibration or extreme temperatures. For example, vibration could create problems when recording data to disk 134, and in particular, when recording data to zones of overlapping tracks such as SMR zones 1 to N. Other conditions that can be monitored by CS behavior module 32 include determining whether computer system 100 is in an idle state or whether computer system 100 is in a low battery state. One example of using such conditions of computer system 100 is shown in the process of FIG. 7 discussed below.

As noted above with reference to FIG. 1, the arrangement of the contents of storage device 106 is merely an example arrangement. Accordingly, the logical representation of FIG. 3 should also be seen as an example logical diagram. For example, heuristic module 28, migration module 30 and CS behavior module 32 should be seen as optional. In alternative embodiments, the processes of these optional modules can be performed entirely by other file systems such as CMR specific file system 20 and/or SMR specific file system 22.

Figure 4:
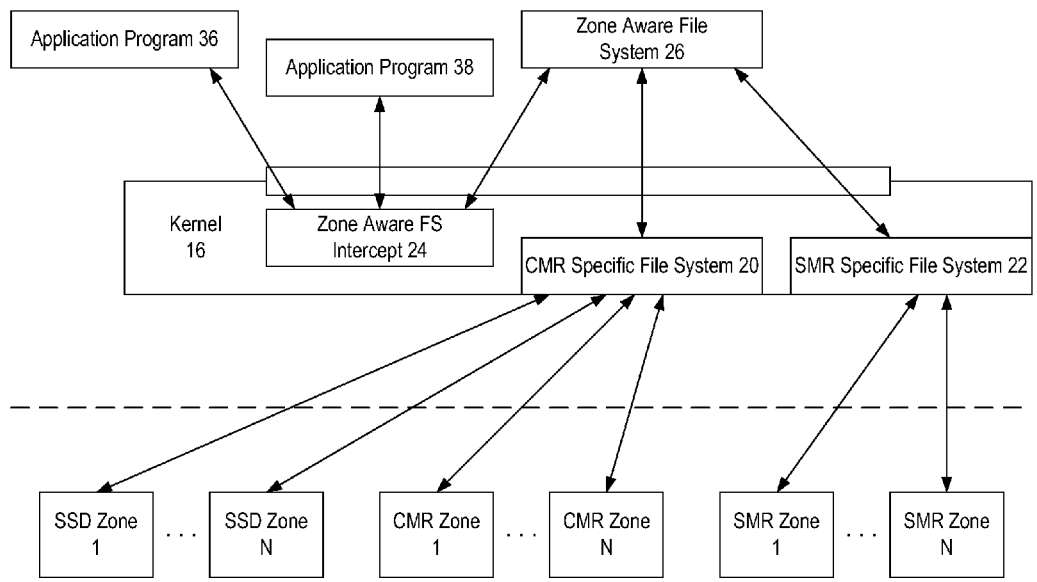
FIG. 4 is a logical diagram depicting an implementation of file systems from FIG. 1 according to an embodiment.

FIG. 4 illustrates a logical diagram depicting one implementation of the file systems of FIG. 1. In the example of FIG. 4, CMR specific file system 20 and SMR specific file system 22 are implemented within kernel 16 of operating system 14. Kernel 16 also includes zone aware FS intercept 24 for passing files between zone aware file system 26 and application programs 36 and 38. Zone aware file system 26 and application programs 36 and 38 are implemented in a user space outside of operating system 14. However, in alternative embodiments, zone aware file system 26 can be, for example, implemented as part of operating system 14 after installing a software patch to operating system 14.

As with FIG. 3, CMR specific file system 20 manages files for SSD zones 1 to N and for CMR zones 1 to N, while SMR specific file system 22 manages files for SMR zones 1 to N. CMR specific file system 20 and SMR specific file system 22 are shown below the dashed line to indicate that they are physically located outside of host 101 in storage devices 106 and 107.

FIG. 5 depicts example files for the user files, downloaded files, and operating system file 18 shown in FIG. 1. The examples of FIG. 5 are also used below in describing the process of FIG. 6.

As shown in FIG. 5, user files 40, 42 and 44 each include file data and a file header with various attributes describing characteristics of the user file. The attributes can comprise metadata for the file that can be stored in either the same zone or a different zone as the file. For example, a file stored in an SMR zone can have its metadata stored in a CMR zone. In such an example, the metadata includes a pointer to point to the location of the file in the SMR zone. The pointer can then be modified to point to a null value if the file is deleted or to point to a different location if the file is moved.

In the example of FIG. 5, the file headers for user files 40, 42, and 44 include attributes for a file name, a file size, a date the file was created, a date the file was last modified, a date the file was last accessed, and a frequency of previous changes to the file. Each of user files 40, 42, and 44 have different file names with different file type extensions indicating different types of files. In the example of FIG. 5, the file type extension ".mp4" in the file name of user file 40 indicates that user file 40 is a video file, and the file type extension ".docx" in the file name of user file 42 indicates that user file 42 is a word processing file. Similarly, the file type extension ".mp3" in the file name of user file 44 indicates that user file 44 is an audio file. Each of these files may be used by different application programs such as application programs 36 and 38. In this example, application program 36 can be a word processing program which uses user file 42 and application program 38 can be a multimedia program which uses user files 40 and 44.

The frequency of previous changes can indicate a number of times the file has been modified over a given period of time. In the example of FIG. 5, user files 40 and 44 have the lowest frequency of previous changes, while user files 42 and operating system 18 have higher frequencies of previous changes. Downloaded files 46 and 48 do not include an attribute for a frequency of previous changes. As will be appreciated by those of ordinary skill in the art, it is not necessary for all files to have the same attributes since zone aware file system 26 can check multiple attribute criteria.

As discussed above with reference to FIG. 1, downloaded files 46 and 48 correspond to streaming files 10 and 12, respectively, which have been received from server 200 via network interface 120 and stored as downloaded files 46 and 48 in storage device 107. The file headers for downloaded files 46 and 48 include many of the same types of attributes as discussed above for user files 40, 42, and 44, namely, a file name, a file size, a date the file was created, and a date the file was last modified.

In addition to the above attributes, the file headers of downloaded files 46 and 48 include an attribute for a stream identifier. The stream identifier can be used to associate the file with a particular stream of data being received from the Internet via network 120 from among multiple streams of data. In one example, a stream identifier is used to route data for different video files to different storage devices, such as different digital video recorders (DVRs) located in different rooms.

In the above example of FIG. 3, heuristic module 28 of zone aware file system 26 determines whether the stream identifier matches a predetermined stream identifier in deciding whether to pass a file to CMR specific file system 20 or to SMR specific file system 22. From there, CMR specific file system 20 or SMR specific file system 22 can use the stream identifier to store the file in a zone associated with the particular stream of data.

FIG. 5 also includes an example for operating system file 18. The file header of operating system file 18 includes attributes for a file name, a file size, a date the file was created, a date the file was last modified, and a date the file was last accessed. As shown in FIG. 5, operating system file 18 has a file type extension of ".log" which indicates operating system file 18 is a log file for an operating system, such as operating system 14.

As will be understood by those of ordinary skill in the art, additional attributes are within the scope of this disclosure. For example, in one alternative embodiment, a file header may contain a redundancy or file priority attribute to indicate that two copies of the file are to be stored for back-up purposes in different zones or in different storage devices. In such an example, a redundancy or priority attribute can cause CMR specific file system 20 to write one copy of a file, such as a boot file, in an SSD zone 140 and in a CMR zone.

In another example, CMR specific file system 20 can use the redundancy or priority attribute to write redundant copies of a file to different disks of two different storage devices using disk synchronization. For example, one copy of the file can be written to disk 134 of storage device 106 while another copy of the file is written to a disk of storage device 107 such that the location of the beginning of the file on disk 134 is rotationally out of phase with the location of the beginning of the file on the disk of storage device 107. By using such disk synchronization, it is ordinarily possible to reduce the time for reading the file since a read command can be sent to both storage devices 106 and 107 and one of the storage devices will read the file before the other storage device.

Figure 6:
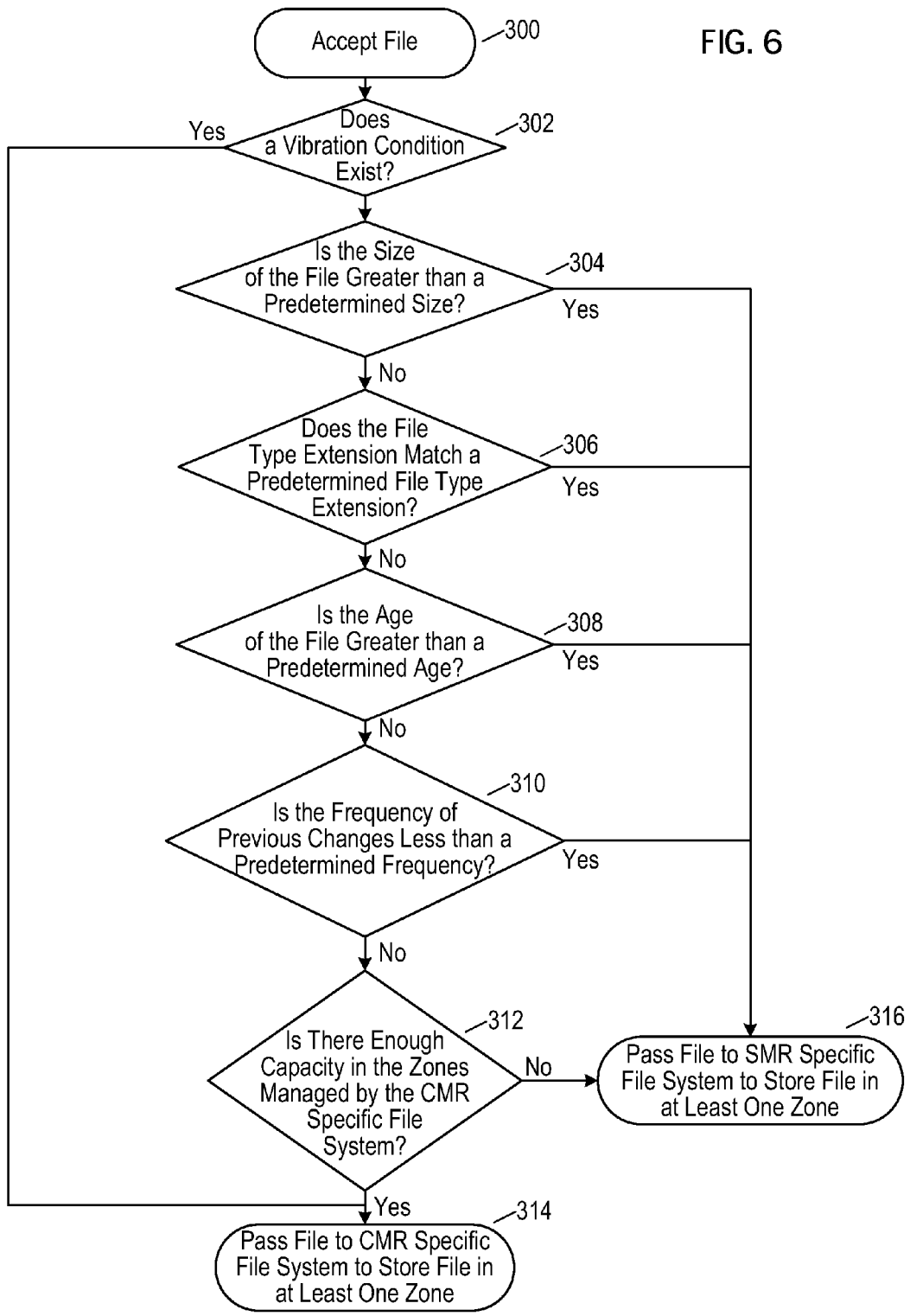
FIG. 6 is a flow chart depicting a process for managing files according to an embodiment.

FIG. 6 is a flow chart depicting a process performed by zone aware file system 26 for managing files according to one embodiment. In block 300, zone aware file system 26 accepts a file. The file could be accepted from an application program, such as application program 36 or 38, or from operating system 14. The file can also be accepted from CMR specific file system 20 or SMR specific file system 22 via migration module 30 of zone aware file system 26. When zone aware file system 26 accepts a file from an application program such as application programs 36 and 38, the file could be a new file created by the application program or the file could have been modified by the application program.

Block 302 is an optional block where CS behavior module 32 of zone aware file system 26 determines whether a vibration condition exists. Such a vibration condition could be detected, for example, by vibration sensors installed in storage device 106 and/or 107. If it is determined that a vibration condition exists, the process proceeds to block 314 to pass the accepted file to CMR specific file system 20 for storage in at least one zone managed by CMR specific file system 20, since the SSD zones and the CMR zones are less susceptible to write errors during vibration than the SMR zones managed by SMR specific file system 22. In alternative embodiments, zone aware file system 26 may delay proceeding with the process until the vibration condition no longer exists instead of passing the file to CMR specific file system 20.

If CS behavior module 32 determines in block 302 that a vibration condition does not exist, heuristic module 28 of zone aware file system 26 determines whether attributes of the accepted file meet various attribute criteria in the following blocks. In block 304, heuristic module 28 determines whether an attribute for the size of the accepted file meets attribute criteria providing that the size of the file is greater than a predetermined file size. If it is determined that the size of the file is greater than the predetermined file size, zone aware file system 26 passes the file to SMR specific file system 22 in block 316 to store the file in at least one SMR zone. With reference to the example files of FIG. 5, if the predetermined file size is 1 GB, zone aware file system 26 would pass user file 40 and downloaded files 46 and 48 to SMR specific file system 22 since the attributes for the size of these files are greater than the predetermined file size.

If zone aware file system 26 determines that the size of the file is not greater than the predetermined size, zone aware file system 26 determines in block 306 whether the file type extension of the file name matches a predetermined file type extension. For example, the attribute criteria can specify predetermined file type extensions such as ".mp3" and ".mp4" which are passed to SMR specific file system 22 for storing the file in at least one SMR zone. In such an example, with reference to the files of FIG. 5, user file 44 would be passed to SMR specific file system 22 in block 316 for storage in an SMR zone, assuming that user file 40 and downloaded files 46 and 48 would have already been passed to SMR specific file system 22 as a result of the determination in block 304.

On the other hand, if zone aware file system 26 determines that file type extension does not match a predetermined file type extension in block 306, zone aware file system 26 determines whether an age of the accepted file is greater than a predetermined age in block 308. In one example embodiment, the age of the file can be a period of time or a date since the file was last modified. With reference again to the example files of FIG. 5, if the predetermined age is based on Apr. 10, 2012, then neither user file 42 or operating system 18 would be passed to SMR specific file system 22 because both files have been modified since this date.

In block 310, zone aware file system 26 determines whether a frequency of previous changes to the accepted file is less than a predetermined frequency of changes in block 308. If it is determined that the frequency of previous changes is less than the predetermined frequency, zone aware file system 26 passes the file to SMR specific file system 22 in block 316. For example, if the predetermined frequency is 1 change per time period, zone aware file system 26 would determine that the frequency of previous changes for user file 44 and operating system file 18 is not less than the predetermined frequency. The process would then continue to block 312 where zone aware file system 26 checks if there is enough capacity for the accepted file in the zones managed by CMR specific file system 20. If so, the accepted file is passed to CMR specific file system 20 in block 314. If it is determined that there is not enough capacity in the zones managed by CMR specific file system 20, the accepted file is passed to SMR specific file system 22 in block 316.

Those of ordinary skill in the art will appreciate that alternative embodiments may not include all or the attribute criteria of blocks 304, 306, 308, and 310. In addition, alternative embodiments may include other attribute criteria such as determining whether the file was last accessed within a certain timeframe. In addition, the order in which different attribute criteria are checked may be different according to various embodiments. For example, some embodiments may check certain attributes that are deemed to be of higher priority first. In some embodiments, a scoring system may be used where a file is sent to a CMR or SMR zone based on an aggregate score of how its individual attributes satisfy the various attribute criteria. Some criteria may be weighted more heavily than others, depending on the implementations.

FIG. 7 is a flowchart depicting a process performed by zone aware file system 26 for controlling a rate of garbage collection according to an embodiment. As used herein, garbage collection refers to a process for reclaiming portions of memory that no longer contain valid data. This process is further described with reference to FIG. 9 below.

In the example of FIG. 7, the process is initiated by CS behavior module 32 of zone aware file system 26 in block 320. In block 321, it is determined whether the amount of data marked obsolete in zones managed by a media specific file system exceeds a threshold. For example, zone aware file system 26 may obtain a value indicating an amount of data marked obsolete in the zones managed by SMR specific file system 22. If it is determined that the value indicating the amount of data marked obsolete does not exceed the threshold, the process ends in block 330. On the other hand, if the value indicating the amount of data marked obsolete does not exceed the threshold, the process proceeds to block 322.

In block 322, CS behavior module 32 determines whether computer system 100 is in an idle state. An idle state can be, for example, when computer system 100 is in a sleep mode or when usage of CPU 108 and/or RAM 110 is relatively low. If CS behavior module 32 determines that computer system 100 is not in an idle state, zone aware file system 26 decreases the rate of garbage collection in block 324 and the garbage collection computer system check ends in block 330. The rate of garbage collection can be decreased by zone aware file system 26 by instructing a media specific file system, such as SMR specific file system 22 to perform less garbage collection.

If CS behavior module 32 determines in block 322 that computer system 100 is in an idle state, CS behavior module 32 determines whether the computer system is in a low battery state in block 326. Such a low battery state can indicate, for example, that there is no power externally supplied to computer system 100 and that a battery of computer system 100 has less than a 25% charge remaining. If it is determined that computer system 100 is in a low battery state, zone aware file system 26 decreases the rate of garbage collection in block 324 and the process ends in block 330. On the other hand, if it is determined in block 326 that computer system 100 is not in a low battery state, zone aware file system 26 increases the rate of garbage collection in block 328 and the process ends in block 330.

Figure 8:
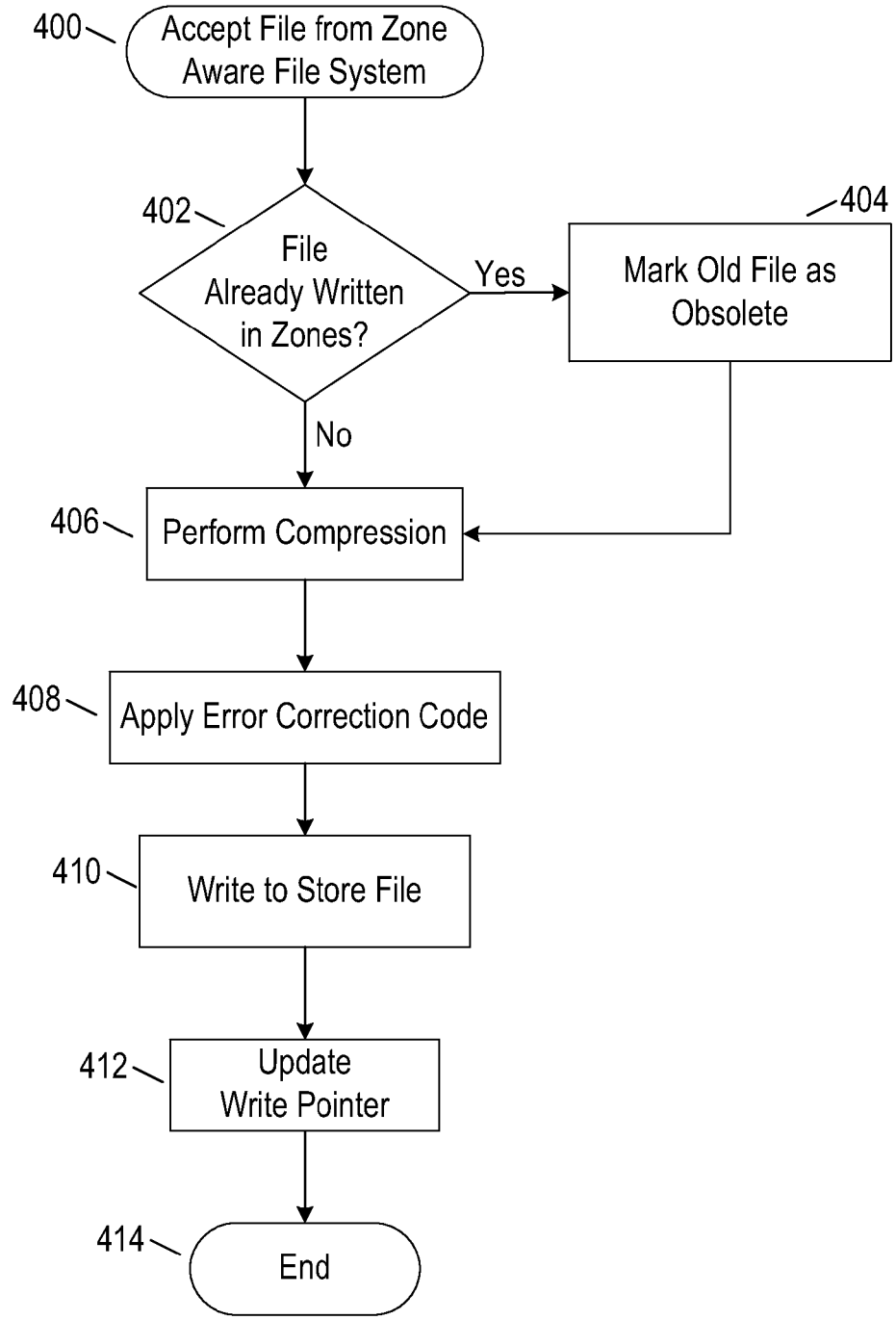
FIG. 8 is a flow chart depicting a process for writing a file in a shingled magnetic recording (SMR) zone according to an embodiment.

FIG. 8 is a flow chart depicting a process performed by SMR specific file system 22 to write a file in an SMR zone. In block 400, SMR specific file system 22 accepts a file from zone aware file system 26 (i.e., from block 316 of FIG. 6). In block 402, SMR specific file system 22 determines whether the accepted file is already written in any of SMR zones 1 to N. If so, SMR specific file system 22 marks the old file written in the zones as obsolete in block 404 and the process proceeds to optional block 406 to perform compression of the accepted file. If in block 402 it is determined that the accepted file is not already written in any of SMR zones 1 to N, the process proceeds directly to optional block 406 to perform compression of the accepted file.

As noted above, performing compression in block 406 is optional. In this regard, by having multiple file systems for managing files stored in different types of storage media, it is ordinarily possible to tailor processes performed by the different media specific file systems to their associated types of storage media and the different types of files managed by the media specific file systems. For example, the zones managed by CMR specific file system 20 may be used primarily for smaller files that are modified more frequently. In this case, performing compression for files stored in zones managed by CMR specific file system 20 may not be as beneficial as performing compression for larger files managed by SMR specific file system 22. Accordingly, compression can be performed by SMR specific file system 22 and not performed by CMR specific file system 20 to better take advantage of the resources of host 101. Similarly, applying an error correction code in block 408 is also optional since smaller files managed by other media specific file systems may not benefit as much from error correction as larger files stored in SMR zones 1 to N. In addition, certain types of media storage may also have more capacity to better handle adding an error correction code wrapper to files.

In optional block 408 of FIG. 8, SMR specific file system 22 applies an error correction code wrapper, such as a Reed Solomon error correction code, to the file. As discussed further with reference to FIG. 10 below, applying such an error correction code wrapper ordinarily increases the ability of SMR specific file system 22 to recover data from a file which may not be properly read. For example, in a 100 MB file, an error correction code strong enough to recover data from a 10 KB error (0.01% of the file) could be used in an SMR zone even though an error this size may be too large for recovery with conventional file systems. This is due to the application of error recovery at a 4 KB sector level with conventional file systems. Thus, the size of correctable errors is typically bounded for conventional file systems at around tens of bytes. By performing error correction at the file level, an SMR specific file system can correct larger sized errors, such as on the order of KB or MB sized errors. This increased error tolerance improves data yield in the sense that media with a higher amount of grown defects are still usable, and also improves reliability in the sense that larger errors and/or a greater amount of errors can be corrected.

In block 410, SMR specific file system 22 writes the file to one of SMR zones 1 to N to store the file. More specifically, if the SMR zone selected for writing is located in storage device 106, for example, SMR specific file system 22 would generate a write command that is sent to controller 122 of storage device 106 via host interface 126. Controller 122 in turn would control head 128 to write the file into the appropriate SMR zone.

In block 412, SMR specific file system 22 updates a write pointer for the SMR zone and the SMR writing process ends in block 414. The write pointer of block 412 identifies a specific sector on a disk, such as disk 134 of FIG. 2, where data was last written in the SMR zone. Each SMR zone has a write pointer to facilitate sequential writing of the SMR zones. The use of such write pointers for sequential writing is further described in incorporated U.S. application Ser. No. 13/525,611.

Figure 9:
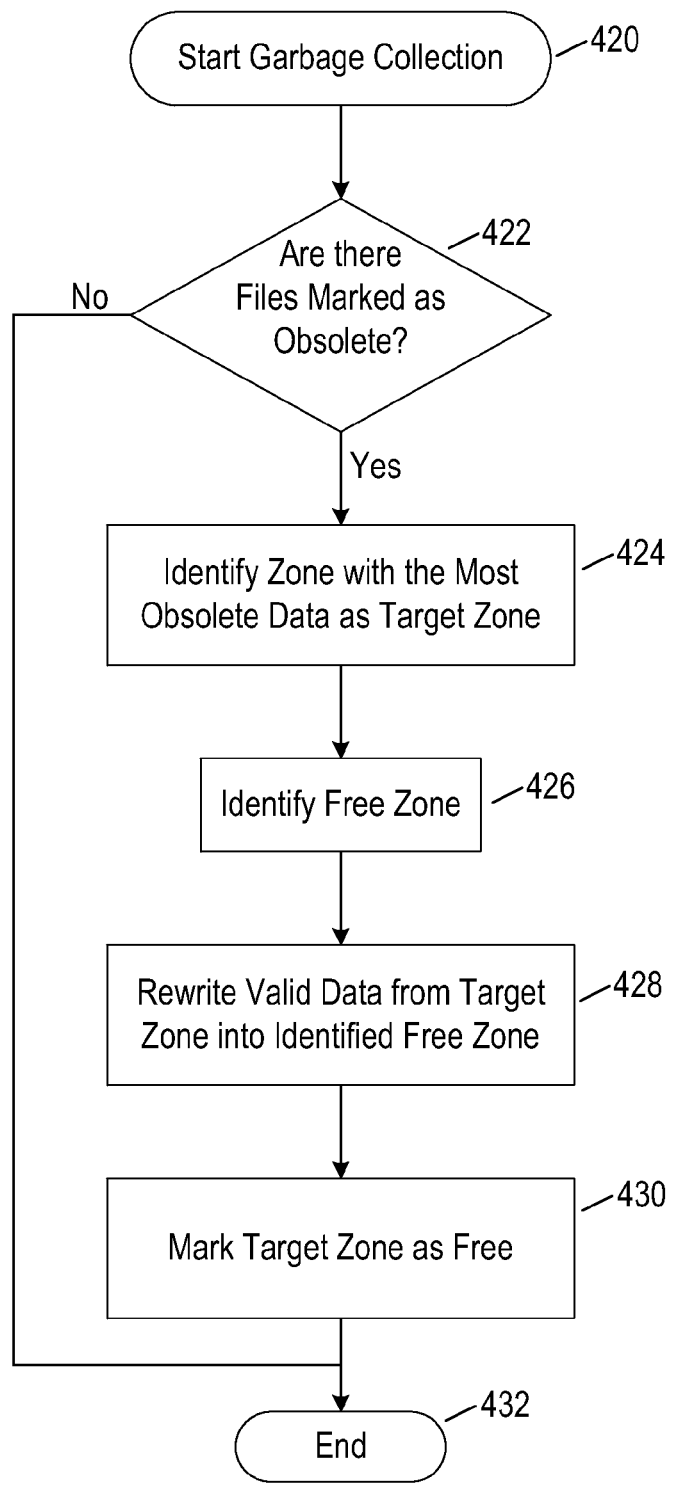
FIG. 9 is a flowchart depicting a process for performing garbage collection according to an embodiment.

FIG. 9 is a flowchart depicting a process for performing garbage collection according to one embodiment. As noted above, whether or not a media specific file system performs garbage collection can depend upon the type of storage media and/or the types of files stored in the storage media. Although the example embodiment of FIG. 9 is performed by SMR specific file system 22, other garbage collection processes could be performed by other file systems of computer system 100. For example, a garbage collection process could also be performed by firmware inside SSD 140 of storage device 106 to reclaim memory regions inside SSD zones 142.

As shown in FIG. 9, SMR specific file system 22 starts the garbage collection process in block 420 and determines whether there are any files in SMR zones 1 to N that are marked as obsolete. Files may be marked as obsolete, for example, as a result of modifications made to the file (e.g., as in block 404 of FIG. 8) or as a result of a migration of the file from one zone to another. If SMR specific file system 22 determines in block 422 that there are no files marked as obsolete, the garbage collection process ends in block 432.

If it is determined in block 422 that there are files marked as obsolete, SMR specific file system 22 identifies the SMR zone having the most obsolete data as a target zone in block 426. In block 428, SMR specific file system 22 identifies a free SMR zone that has enough free capacity to accommodate the remaining valid data from the target zone. In block 428, SMR specific file system 22 rewrites the valid data from the target zone into the free zone identified in block 426. The target zone is then marked as free in block 430 which can allow SMR specific file system 22 to write data into the target zone for future writes. The garbage collection process then ends in block 432.

Figure 10:
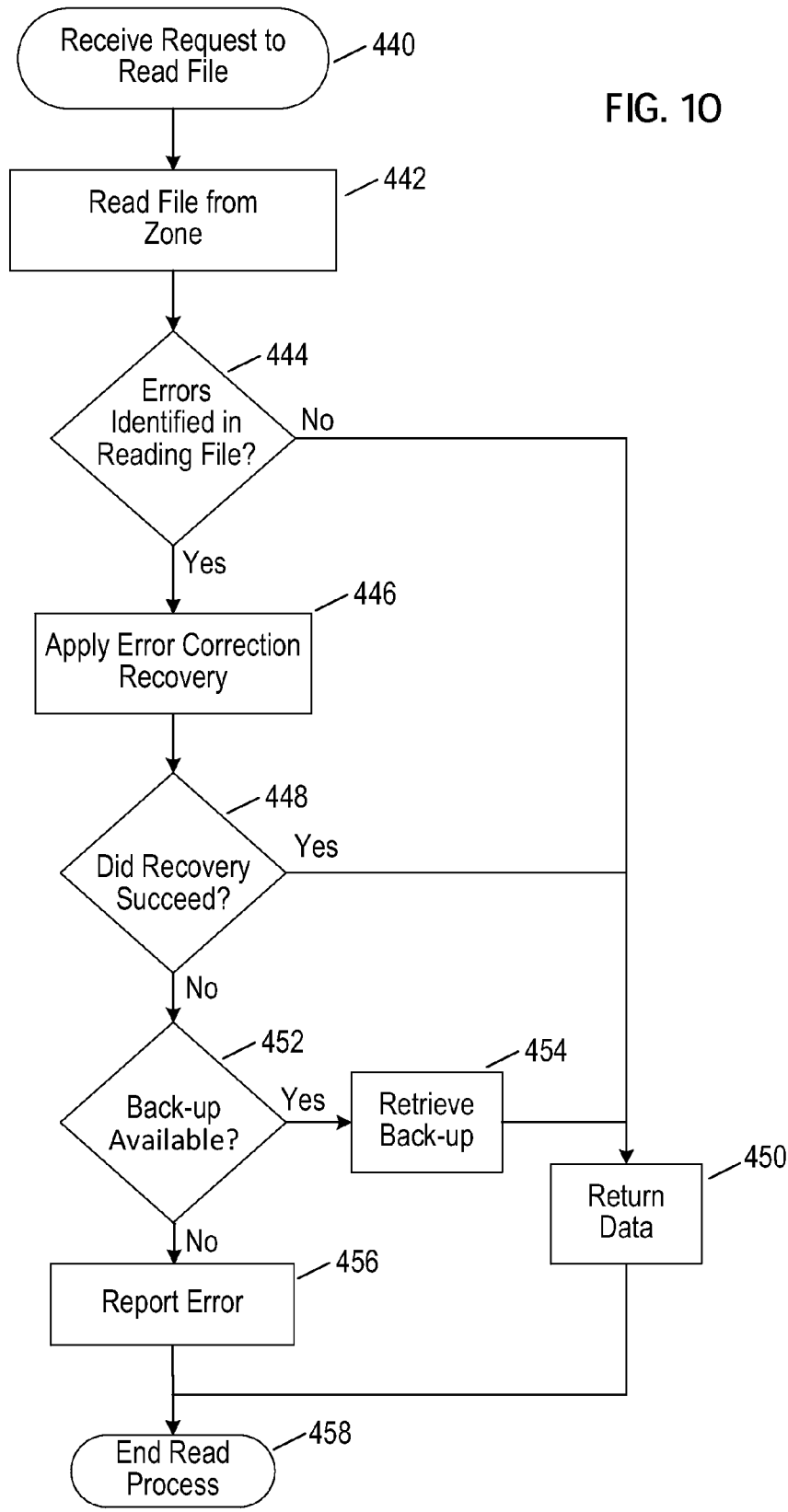
FIG. 10 is a flow chart for reading a file with error correction recovery according to an embodiment.

FIG. 10 is a flow chart for a read process including error correction recovery according to one embodiment. The process described below is performed by SMR specific file system 22 when reading a file from an SMR zone, but those of ordinary skill in the art will understand that the process of FIG. 10 could also be performed by other media specific file systems. The read process begins in block 440 after receiving a request to read a file from an SMR zone. A request to read a file can come from a read request generated by an application program, such as application programs 36 and 38 or as part of a migration process when moving a file from one zone to another. In block 442, SMR specific file system 22 reads the file and in block 444 it is determined whether there were any errors identified in reading the file. If no errors were identified in block 444, SMR specific file system 22 returns the data read from the file in block 450 and the process ends in block 458.

On the other hand, if an error is identified in block 444, SMR specific file system 22 applies an error correction recovery in block 446 to recreate data associated with any identified errors. Such an error correction recovery could include a Reed Solomon error correction recovery.

In block 448, SMR specific file system 22 checks the file after applying the error correction recovery in block 446 to determine whether the error correction recovery succeeded. If so, SMR specific file system 22 returns the data read from the file including the corrected data in block 450 and the process ends in block 458. If it is determined in block 448 that the error correction recovery did not succeed, SMR specific file system 22 checks in block 452 whether there is a back-up of the file available. If so, the back-up file is retrieved in block 454 and its data is returned in block 450. If no back-up file is available in block 452, SMR specific file system 22 reports an error in reading the file in block 456. The error can be reported to the source of the read request, such as application programs 36 and 38. The read process then ends in block 458.

Those of ordinary skill in the art will appreciate that the various illustrative logical blocks, modules, and algorithm steps described in connection with the examples disclosed herein may be implemented as electronic hardware, computer software, or combinations of both. Furthermore, the foregoing algorithm steps can be embodied on a computer readable medium which causes a processor or computer to perform or execute certain functions.

To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or algorithm described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A method performed by a computer system for managing files among different zones of storage media in at least one non-volatile data storage device of the computer system, wherein at least a first zone is associated with a first type of storage media and a second zone is associated with a second type of storage media, the method comprising:
   accepting a file having a stream identifier associating the file with a stream of data;
   determining whether the stream identifier matches a predetermined stream identifier for a particular stream of data among multiple streams of data; and
   storing the file in the first zone if the stream identifier matches the predetermined stream identifier so that the file is stored with other files associated with the particular stream of data in the first zone.

2. The method of claim 1, wherein the first zone includes overlapping tracks on a disk of a first disk drive.

3. The method of claim 2, wherein the second zone includes non-overlapping tracks on a disk of the first disk drive, non-overlapping tracks on a disk of a second disk drive, or a memory region in a solid state drive.

4. The method of claim 3, wherein the method further comprises marking the file as obsolete in the second zone if the file is stored in the first zone.

5. The method of claim 3, further comprising:
determining whether a vibration condition exists in the at least one non-volatile data storage device; and
storing the file in the second zone when it is determined that the vibration condition exists.

6. The method of claim 1, wherein the file is stored in both the first and second zones when it is determined that the stream identifier matches the predetermined stream identifier.

7. The method of claim 1, wherein a first file system is used for files in the first zone and a second file system is used for files in the second zone.

8. The method of claim 1, further comprising:
determining whether a vibration condition exists in the at least one non-volatile data storage device; and
delaying the storing of the file until it is determined that the vibration condition no longer exists.

9. The method of claim 1, further comprising:
determining whether the computer system is in an idle state; and
increasing a rate of garbage collection of data in the at least one non-volatile data storage device if it is determined that the computer system is in the idle state.

10. The method of claim 1, further comprising:
determining whether the computer system is in a low battery state; and
decreasing a rate of garbage collection of data in the at least one non-volatile data storage device if it is determined that the computer system is in the low battery state.

11. The method of claim 1, wherein storing the file further comprises compressing the file before storing the file depending on whether the file is to be stored in the first zone or the second zone.

12. The method of claim 1, wherein storing the file further comprises adding an error correction wrapper to the file before storing the file depending on whether the file is to be stored in the first zone or the second zone.

13. A host device capable of managing files among different zones of storage media in at least one non-volatile data storage device connected to the host device, wherein at least a first zone is associated with a first type of storage media and a second zone is associated with a second type of storage media, the host device comprising:
a memory configured to store computer-executable instructions; and
a processor configured to execute the computer-executable instructions stored in the memory;
wherein the computer-executable instructions stored in the memory cause the processor to:
accept a file having a stream identifier associating the file with a stream of data;
determine whether the stream identifier matches a predetermined stream identifier for a particular stream of data among multiple streams of data; and
generate a write command for the at least one non-volatile data storage device to store the file in the first zone if the stream identifier matches the predetermined stream identifier so that the file is stored with other files associated with the particular stream of data in the first zone.

14. The host device of claim 13, wherein the first zone includes overlapping tracks on a disk of a first disk drive.

15. The host device of claim 14, wherein the second zone includes non-overlapping tracks on a disk of the first disk drive, non-overlapping tracks on a disk of a second disk drive, or a memory region in a solid state drive.

16. The host device of claim 15,
wherein the computer-executable instructions stored in the memory further cause the processor to mark the file as obsolete in the second zone if the file is stored in the first zone.

17. The host device of claim 15, wherein the computer-executable instructions further cause the processor to:
determine whether a vibration condition exists in the at least one non-volatile data storage device; and
generate the write command to store the file in the second zone when it is determined that the vibration condition exists.

18. The host device of claim 13, wherein the processor generates the write command to store the file in the first zone and the second zone when the processor determines that the stream identifier matches the predetermined stream identifier.

19. The host device of claim 13, wherein the processor executes computer-executable instructions of a first file system for files in the first zone and executes computer-executable instructions of a second file system for files in the second zone.

20. The host device of claim 13, wherein the computer-executable instructions further cause the processor to:
determine whether a vibration condition exists in the at least one non-volatile data storage device; and
delay generating the write command when it is determined that the vibration condition exists.

21. The host device of claim 13, wherein a computer system includes the host device and the at least one non-volatile data storage device, and wherein the computer-executable instructions stored in the memory further cause the processor to:
determine whether the computer system is in an idle state; and
increase a rate of garbage collection of data in the at least one non-volatile data storage device if it is determined that the computer system is in the idle state.

22. The host device of claim 13, wherein a computer system includes the host device and the at least one non-volatile data storage device, and wherein the computer-executable instructions stored in the memory further cause the processor to:
determine whether the computer system is in a low battery state; and
decrease a rate of garbage collection of data in the at least one non-volatile data storage device if it is determined that the computer system is in the low battery state.

23. The host device of claim 13, wherein the computer-executable instructions stored in the memory further cause the processor to compress the file before storing the file depending on whether the file is to be stored in the first zone or in the second zone.

24. The host device of claim 13, wherein the computer-executable instructions stored in the memory further cause the processor to add an error correction wrapper to the file before storing the file depending on whether the file is to be stored in the first zone or in the second zone.

25. A non-transitory computer-readable medium storing computer-executable instructions for managing files among different zones of storage media in at least one non-volatile data storage device, wherein at least a first zone is associated with a first type of storage media and a second zone is associated with a second type of storage media, and wherein when the computer-executable instructions are executed by a processor, the computer-executable instructions cause the processor to:
- accept a file having a stream identifier associating the file with a stream of data;
- determine whether the stream identifier matches a predetermined stream identifier for a particular stream of data among multiple streams of data; and
- generate a write command to store the file in the first zone if the stream identifier matches the predetermined stream identifier so that the file is stored with other files associated with the particular stream of data in the first zone.

26. A method performed by a computer system for managing files among different zones of storage media in at least one non-volatile data storage device of the computer system, wherein at least a first zone is associated with a first type of storage media and a second zone is associated with a second type of storage media, the method comprising:
- accepting a file having at least one attribute describing a characteristic of the file;
- determining whether the at least one attribute of the file meets an attribute criteria; and
- storing the file in the first zone and/or the second zone based on the determination of whether the at least one attribute meets the attribute criteria,
- wherein the file is stored in a zone of tracks on a disk of a first disk drive and in a zone on a disk of a second disk drive, and wherein rotation of the disk of the first disk drive is synchronized with rotation of the disk of the second disk drive and the location of the beginning of the file on the disk of the first disk drive is rotationally out of phase with the location of the beginning of the file on the disk of the second disk drive.

27. A host device capable of managing files among different zones of storage media in at least one non-volatile data storage device connected to the host device, wherein at least a first zone is associated with a first type of storage media and a second zone is associated with a second type of storage media, the host device comprising:
- a memory configured to store computer-executable instructions; and
- a processor configured to execute the computer-executable instructions stored in the memory;
- wherein the computer-executable instructions stored in the memory cause the processor to:
- accept a file having at least one attribute describing a characteristic of the file;
- determine whether the at least one attribute of the file meets an attribute criteria; and
- store the file in the first zone and/or the second zone based on the determination of whether the at least one attribute meets the attribute criteria,
- wherein the file is stored in a zone of tracks on a disk of a first disk drive and in a zone on a disk of a second disk drive, and wherein rotation of the disk of the first disk drive is synchronized with rotation of the disk of the second disk drive and the location of the beginning of the file on the disk of the first disk drive is rotationally out of phase with the location of the beginning of the file on the disk of the second disk drive.

* * * * *